(12) United States Patent
Klatt et al.

(10) Patent No.: US 6,443,361 B1
(45) Date of Patent: Sep. 3, 2002

(54) PC-CARD CHIP-CARD READER

(75) Inventors: Dieter Klatt, Wülfrath; Arnd Bäcker, Hellenthal, both of (DE)

(73) Assignee: Stocko Contact GmbH & Co. KG (DE)

(*) Notice: Subject to any disclaimer, the term of this patent is extended or adjusted under 35 U.S.C. 154(b) by 0 days.

(21) Appl. No.: 09/583,818

(22) Filed: May 30, 2000

(30) Foreign Application Priority Data

May 28, 1999 (DE) .................................. 299 09 222 U

(51) Int. Cl.[7] .................................................. G06K 7/00
(52) U.S. Cl. ......................... 235/486; 235/384; 235/492
(58) Field of Search .............................. 235/384, 486, 235/492

(56) References Cited

U.S. PATENT DOCUMENTS

| | | | | |
|---|---|---|---|---|
| 4,743,746 A | * | 5/1988 | Murschall et al. | 235/486 |
| 5,528,459 A | | 6/1996 | Ainsbury et al. | 361/737 |
| 5,796,093 A | * | 8/1998 | Reichardt et al. | 235/492 |
| 5,847,698 A | * | 12/1998 | Reavey et al. | 345/173 |
| 5,877,488 A | * | 3/1999 | Klatt et al. | 235/486 |
| 6,145,748 A | * | 11/2000 | Neifer et al. | 235/486 |

FOREIGN PATENT DOCUMENTS

| | | | |
|---|---|---|---|
| DE | 3632294 | * | 4/1988 |
| DE | 298 11 425 | | 9/1998 |
| WO | WO 91/04548 | * | 4/1991 |

* cited by examiner

*Primary Examiner*—Michael G. Lee
*Assistant Examiner*—Soung H Lee
(74) *Attorney, Agent, or Firm*—R W Becker & Associates; R W Becker

(57) ABSTRACT

A contact unit for a card-shaped carrier element of electronic components, especially for ISO 7816 chip cards, is provided and includes an insertable card-shaped housing that has a base plate and a cover plate that is congruent thereto at least in the transverse direction, between which is formed a slot-like insertion channel that opens on one side of the housing for receiving a chip-card, and that at the opposing side is provided with a plug-in strip, especially in accordance with the PCMCIA standard, and that furthermore has arranged parallel to said 10 insertion channel in said housing a printed circuit board that is connected electrically to the plug-in strip and that is provided on its surface with a contact field for contact with the chip-card, whereby only the base plate is extended with a flat, lower-lip type segment that is joined to the base plate via a breaking line.

11 Claims, 3 Drawing Sheets

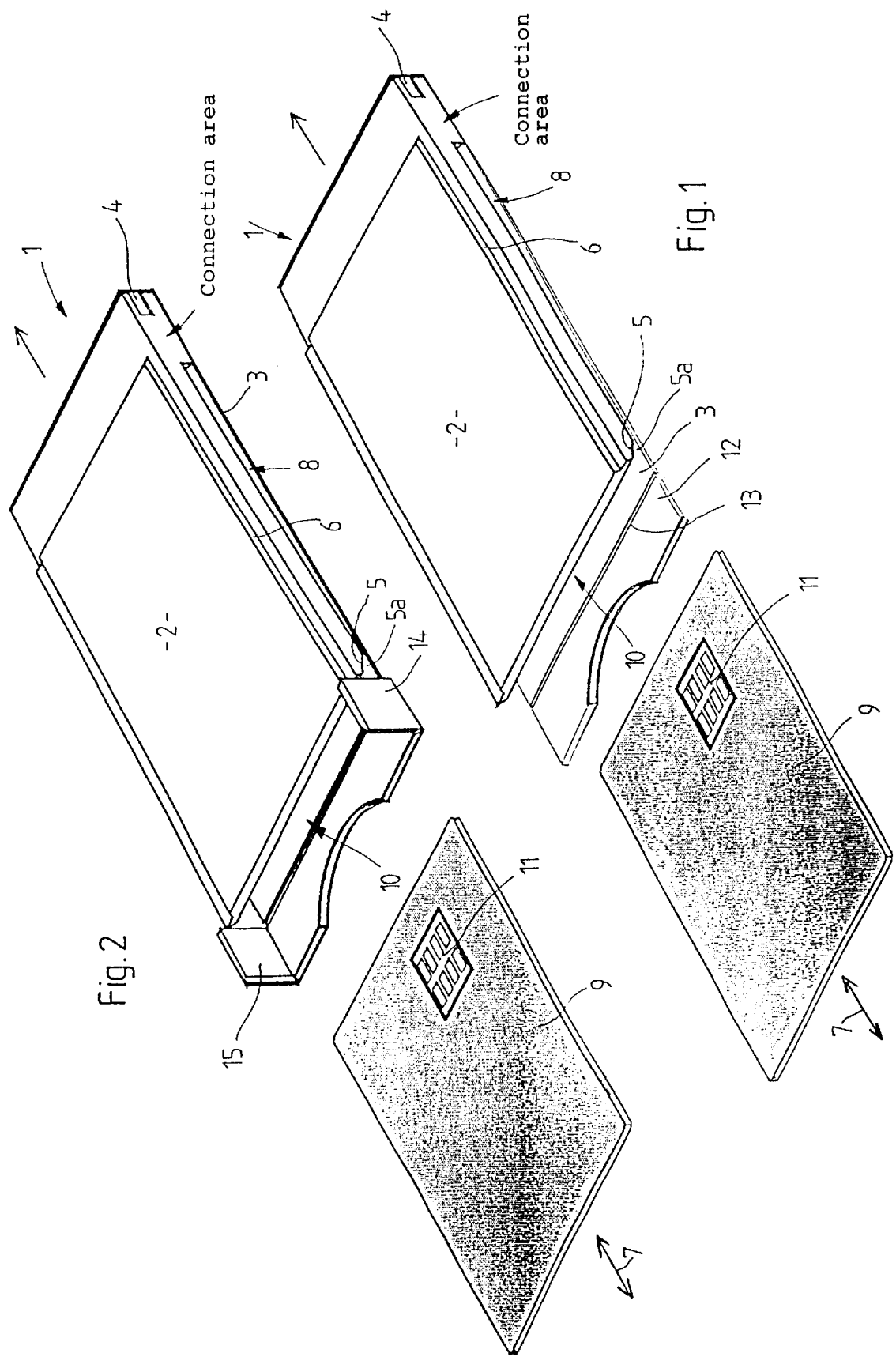

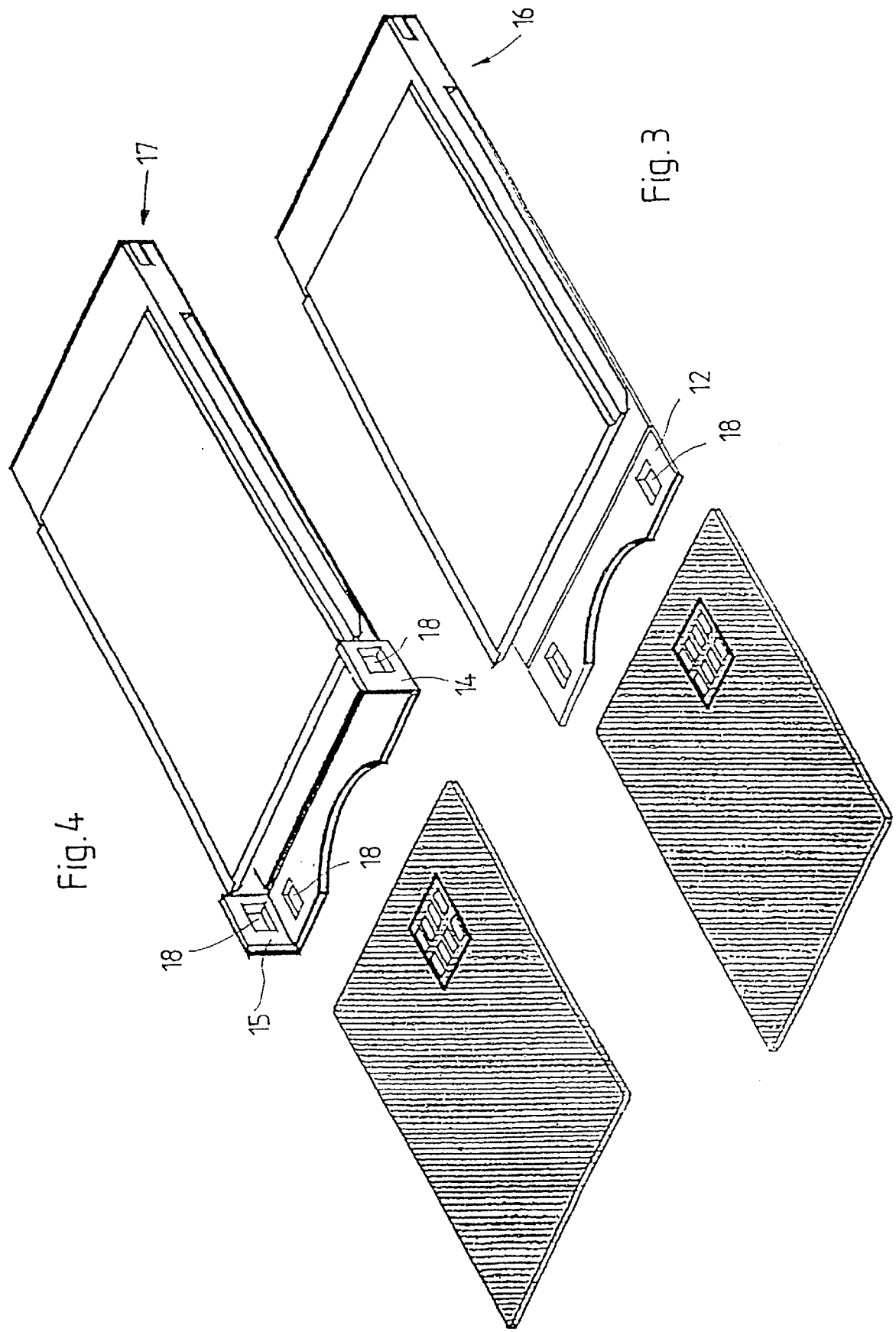

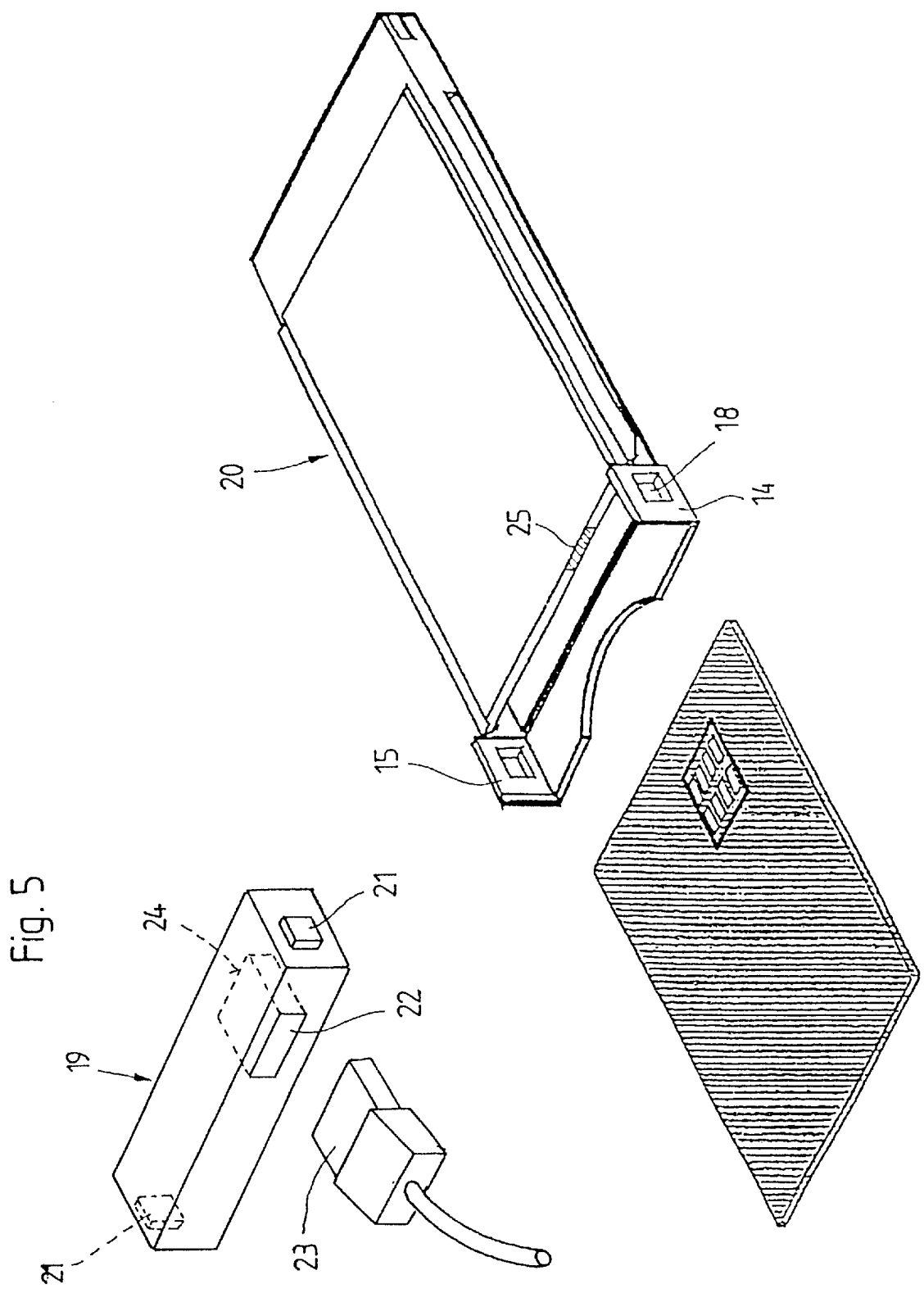

PC-CARD CHIP-CARD READER

BACKGROUND OF THE INVENTION

The invention concerns a contact unit for a card-shaped carrier element of electronic components, especially for ISO 7816 chip cards, with an insertable card-shaped housing that has a base plate and a cover plate that is congruent thereto at least in the transverse direction, between which is formed a slot-like insertion channel that opens on one side of the housing for receiving a chip-card, and that at the opposing side is provided with a plug-in strip, especially in accordance with the PCMCIA standard, and that furthermore has arranged parallel to the insertion channel in the housing a printed circuit board that is connected electrically to the plug-in strip and that is provided on its surface with a contact field for contact with the chip-card.

Chip-card readers of this type are known, e.g. in German Utility Model DE 298 11 425 U1. They are suitable for being connected via the plug-in strip, especially in accordance with the PCMCIA standard, to data processing systems, e.g. notebook computers, and are used therein for evaluating data or for running applications, e.g. opening access authorization to data networks, performing at-home banking, or even for expanding memory, using the telephone, etc. Another application for this type of chip-card reader is as a common interface in connection with digital television. A short version of reading devices, especially in accordance with PCMCIA type 11, is used for all notebook applications; it can be inserted in its entirety into the insertion chamber of the notebook without parts projecting therefrom and thereby impairing mobility and ease of use when it is in its inserted condition. In contrast, digital television applications use a longer version of these reading devices, in which the housing in the rearward area, that is, at the side opposing the plug-in strip, is provided with an extension that guides the chip-card to be inserted and that facilitates use of the reading device. The extension represents a type of pre-positioned guide for the chip-card and mechanically stabilizes the chip-card reader for the very demanding operating conditions on the consumer market. It is not possible to use such reading devices with the extension projecting from the module receiving slot of the computer when in the operating position, e.g. in notebooks, since there is the risk during mobile use that contact will be impaired and that transport problems will occur.

There is therefore a need to make available short reading devices for notebook computers and similar devices for mobile usage depending on the area of application and to use the long version with the extended region during stationary use, e.g. in digital television applications. These requirements represent a significant obstacle in terms of production because different manufacturing processes and machines must be used for the different devices and furthermore the entire issue of logistics and storage becomes more complex.

It is therefore an object of the invention to improve a contact unit of the type described in the foregoing such that both the short version and the long version of the reading device can be produced in one manufacturing process.

BRIEF DESCRIPTION OF THE DRAWINGS

The object and advantages of the present invention will appear more clearly from the following specification in conjunction with the accompanying drawings, in which:

FIG. 1   is a perspective view of a long version of a contact unit;
FIG. 2   is a perspective view of a modified contact unit with a U-shaped segment;
FIG. 3   is a perspective view of a modified embodiment of the long version of a contact unit;
FIG. 4   is a perspective view of a modified embodiment;
FIG. 5   is a perspective view of an additional electric module that can be employed with an appropriately-prepared long version of the contact unit.

SUMMARY OF THE INVENTION

The object of the present invention, with a contact unit of the type described in the foregoing that is a short version without the housing extension, is characterized primarily in that only the base plate is extended with a flat, lower-lip type segment that is joined to the base plate via a breaking line. For improving the guidance for the chip-card, it can be advantageous to configure the segment in a U-shape, i.e. with lateral legs. An upper cover of the otherwise open U-shaped segment piece can also be provided for special applications.

Combining the short version of the chip-card reading device, which is known per se, with a segment that is selectably separable at the breaking line in a shape corresponding to the application purpose, i.e. lower-lip type or U-shaped or box-shaped, makes it possible to produce either the short version (for notebook computer use) or the extended version (for digital television on set-top boxes) in a single manufacturing process in that the option for separating the extended area is simply either used (for notebook computer applications) or is not used (for digital television).

Preferably the base plate is connected to the cover plate in the region of the plug-in strip and the connection can be made, e.g., by means of welding tabs, ultrasonic welding, adhesive, or bolt connections. Preferably the insertion channel is open on both sides over its entire length in the direction of insertion of the chip-card and the base plate is joined to the cover plate exclusively in the region of the plug-in strip such that a pre-stress is provided between the base plate and the cover plate. In this manner, inserting the chip-card causes a slight movement between base plate and cover plate against the effect of the restoring force. Both the short and the long version of this embodiment offer the advantage that when the chip-card is inserted in the reading device it is retained clamp-like in the insertion channel, whereby high dimensional stability of the contact unit is achieved, as well as compensation of production-imposed tolerances. This advantageous measure is not possible in the previously-known long versions of contact units.

In accordance with another embodiment of the invention, it can be advantageous to join the segment to the base plate via one or more breaking points. It can also be useful to construct the extended region constituting the segment from partial segments that can be separated depending on configuration.

In accordance with another embodiment of the invention, the segment and/or the lateral guides are provided with through-holes and/or lock elements, which can also be provided for making it possible to additionally or retroactively receive additional electric modules in the long version, whereby an electrical connection to the printed circuit board is provided. Such modules can include memory expansions, adapters for smaller memory cards (e.g. SIM cards, multimedia cards, compact flash cards, smart media cards, etc.), fax/modem, ISDN, ADSL or LWL transmission, as well as other options for connectable input devices, e.g. a keyboard or biometric input device.

Further specific features of the present invention will be described in detail subsequently.

DESCRIPTION OF PREFERRED EMBODIMENTS

Referring now to the drawings in detail, the exemplary embodiment of the invention illustrated in FIG. 1 shows a contact unit I embodied as a chip-card reader that is provided for contact with a set-top box for digital television (not shown) via a standard PCMCIA interface. The contact unit 1 comprises a two-member external housing 2 with a base plate 3, a PCMCIA interface field in the form of a plug-in strip 4 with 68 poles at the front end (relative to the direction in which it is inserted into the set-top box, as indicated by the arrow), upper and lower insertion guides 5, 5a on the opposing end for introducing an ISO 7816 chip-card 9, and a cover plate 6 that extends parallel to and at a distance from the base plate 3 and that is rigidly joined to the base plate 3 in the region of the plug-in strip 4. In the interior of the housing 2, arranged at a distance parallel to the base plate, is a printed circuit board (not shown in the drawing) such that formed therebetween is an insertion channel 8 for the ISO 7816 chip-card 9 that is insertable into the contact unit 1 via an insertion slot 10 that extends between the insertion guides 5, 5a. The chip-card 9 can be inserted into and withdrawn from the contact unit 1 in the direction of the double arrow 7 shown in FIG. 1, whereby contact can be created by means of the chip field 11 arranged on the surface of the chip-card 9 and an internal contact field (not shown) on the underside of the printed circuit board, which contact makes it possible to process the chip-card 9 when the contact unit I is inserted into the insertion slot of the set-top box and is connected to its PCMCIA interface via the plug-in strip 4.

As can be seen from the drawing, the insertion channel 8 is open on both sides over its entire length in the direction of insertion of the chip-card, and the base plate 3 is joined to the cover plate 6 exclusively in the region of the plug-in strip (connection area indicated by arrow). The connection area is configured such that a pre-stress is provided between the base plate 3 and the cover plate 6, and the pre-stress causes the insertion channel 8 to narrow toward the insertion slot 10 when the chip-card 9 is not inserted. If the chip-card 9 is now inserted into the insertion channel 8, it causes a slight upward movement of the cover plate 6 against the effect of the pre-stress so that a clamping function is achieved for the chip card 9.

The base plate 3 of the contact unit 1 is extended by a flat, lower lip-type segment 12 that is joined to the base plate 3 by means of a breaking line 13. It can be seen that both a short version and a longer version of the contact unit 1 can be produced from a single manufacturing process using this measure in that either segment 12 is broken off using the breaking line 13 to produce a short version or it is left to produce a long version. For improving the guidance for the chip-card 9, in accordance with the drawing in FIG. 2 the segment 12 can be configured in a U-shape in that the segment is provided with lateral guides 14, 15. It should be mentioned that the lateral guides 14, 15 are joined exclusively to the segment 12 and can be removed therewith in the breaking process used to produce a short version.

The specification makes it clear that the concept described for the housing makes possible a chip-card reader manufactured in an extended-version, as is used for digital television for set-top boxes, among others, and by separating the extended region—the segment 12 along with the lateral guides 14, 15—it can also be converted to the short version, which can especially be employed for notebook computer applications.

The embodiment of a chip-card reader 16 and 17 illustrated in FIGS. 3 and 4 is distinguished from those described in the foregoing for FIGS. 1 and 2 in that the segment 12 and/or the lateral guides 14, 15 are provided with through-holes 18 in which locking elements can engage, this making it possible for the longer version to further receive additional electrical modules.

Such a module 19 is shown in a perspective view in the drawing in FIG. 5. The essentially prism-shaped module 19 has dimensions that correspond to the free interior space in the segment 12 with lateral guides 14, 15 and is provided with locking projections 21. The module 19 carries a jack member 22 for connecting with a plug 23 and on its front side has a contact surface 24 that cooperates with a corresponding contact surface 25 of the associated chip-card reader 20 when the module 19 is employed and locked with the through-holes 18 of the lateral guides 14, 15.

The specification incorporates by reference the disclosure of German priority document 299 09 222.4 of May 28, 1999.

The present invention is, of course, in no way restricted to the specific disclosure of the specification and drawings, but also encompasses any modifications within the scope of the appended claims.

What is claimed is:

1. In a contact unit for a card-shaped carrier element of electronic components and including an insertable card-shaped housing that has a base plate and a cover plate that is congruent thereto at least in the transverse direction and between which is formed a slot-like insertion channel that opens on one end of said housing for receiving a chip-card, wherein an opposite end of said housing is provided with a plug-in strip, and wherein a printed circuit board is disposed in said housing parallel to said insertion channel and is electrically connected to said plug-in strip and is furthermore provided on its surface with a contact field for contact with said chip-card, the improvement wherein:

exclusively said base plate, at said one end thereof, is provided with an extension in the form of a flat, extending segment that is joined to said base plate via a breaking line to form a first, convertible contact unit, wherein a second contact unit is formed when said segment is detached at said breaking line, and wherein said second contact unit is shorter than said first, convertible contact unit.

2. A contact unit according to claim 1, wherein said segment has a U-shaped configuration, including lateral guides.

3. A contact unit according to claim 2, wherein an upper cover is provided for said U-shaped segment.

4. A contact unit according to claim 2, wherein at least one of said segment and said lateral guides are provided with at least one of through-holes or lock elements.

5. A contact unit according to claim 4, wherein means are provided for receiving one or more electrical modules, and wherein an electrical connection to said printed circuit board is provided.

6. A contact unit according to claim 1, wherein said base plate is connected to said cover plate in the vicinity of said plug-in strip.

7. A contact unit according to claim 1, wherein said insertion channel is open on opposite sides, between said ends of said housing, over its entire length and in a direction of insertion of said chip-card, and wherein said base plate is joined to said cover plate exclusively in the vicinity of said plug-in strip such that a prestress is provided between said base plate and said cover plate.

8. A contact unit according to claim 1, wherein said breaking line that characterizes the joining of said segment to said base plate is comprised of one or more breaking points.

9. A contact unit according to claim 1, wherein said segment comprises partial segments that are separately separable from said base plate.

10. A contact unit according to claim 1, wherein said segment is provided with at least one of through-holes or lock elements.

11. A contact unit according to claim 10, wherein means are provided for receiving one or more electric modules, and wherein an electrical connection to said printed circuit board is provided.

* * * * *

UNITED STATES PATENT AND TRADEMARK OFFICE
CERTIFICATE OF CORRECTION

PATENT NO. : 6,443,361 B1  
DATED : September 3, 2002  
INVENTOR(S) : Klatt et al.

It is certified that error appears in the above-identified patent and that said Letters Patent is hereby corrected as shown below:

<u>Title page,</u>
Item [57], ABSTRACT, should read as follows:

-- [57]         ABSTRACT

A contact unit for a card-shaped carrier element of electronic components, especially for ISO 7816 chip cards, is provided and includes an insertable card-shaped housing that has a base plate and a cover plate that is congruent thereto at least in the transverse direction, between which is formed a slot-like insertion channel that opens on one side of the housing for receiving a chip-card, and that at the opposing side is provided with a plug-in strip, especially in accordance with the PCMCIA standard, and that furthermore has arranged parallel to said insertion channel in said housing a printed circuit board that is connected electrically to the plug-in strip and that is provided on its surface with a contact field for contact with the chip-card, whereby only the base plate is extended with a flat, lower-lip type segment that is joined to the base plate via a breaking line. --

Signed and Sealed this

Thirteenth Day of May, 2003

JAMES E. ROGAN  
*Director of the United States Patent and Trademark Office*